US012585724B2

(12) United States Patent
Tang et al.

(10) Patent No.: US 12,585,724 B2
(45) Date of Patent: Mar. 24, 2026

(54) METHOD, APPARATUS, COMPUTING DEVICE AND COMPUTER-READABLE STORAGE MEDIUM FOR IDENTIFYING SIGNAL

(71) Applicant: BOE TECHNOLOGY GROUP CO., LTD., Beijing (CN)

(72) Inventors: Dawei Tang, Beijing (CN); Ge Ou, Beijing (CN); Xiaohui Ma, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 1176 days.

(21) Appl. No.: 17/519,277

(22) Filed: Nov. 4, 2021

(65) Prior Publication Data

US 2022/0318548 A1 Oct. 6, 2022

(30) Foreign Application Priority Data

Mar. 31, 2021 (CN) .......................... 202110351582.8

(51) Int. Cl.
*G06F 17/14* (2006.01)

(52) U.S. Cl.
CPC ........ *G06F 17/141* (2013.01); *G06F 2218/14* (2023.01); *G06F 2218/20* (2023.01)

(58) Field of Classification Search
CPC ..... H04L 27/265; H04L 27/38; G06F 14/141; G06F 14/142; G06F 2218/14; G06F 2218/20
USPC .............. 375/219, 220, 259, 260, 324, 340; 370/210, 282; 455/78, 84
See application file for complete search history.

(56) References Cited

U.S. PATENT DOCUMENTS

| | | | |
|---|---|---|---|
| 4,958,638 A | 9/1990 | Sharpe et al. | |
| 2011/0054270 A1* | 3/2011 | Derchak ................ | A61B 5/318 600/300 |
| 2020/0397310 A1 | 12/2020 | Gu et al. | |
| 2021/0022619 A1* | 1/2021 | Ho ........................ | A61B 5/0507 |

FOREIGN PATENT DOCUMENTS

| | | |
|---|---|---|
| CN | 104605829 A | 5/2015 |
| CN | 105824020 A | 8/2016 |
| CN | 111563580 A | 8/2020 |

(Continued)

OTHER PUBLICATIONS

Chinese Office Action corresponding to Chinese Patent Application No. 202110351582.8 (Foreign Text, 9 Pages, English Translation Thereof, 8 Pages) (Nov. 21, 2024).

(Continued)

*Primary Examiner* — Young T. Tse
(74) *Attorney, Agent, or Firm* — Myers Bigel, P.A.

(57) ABSTRACT

It is disclosed a method, an apparatus, a computing device, and a computer-readable storage medium for identifying a signal. The method includes demodulating a modulated signal to generate a transmission signal, transmitting the transmission signal, receiving an echo signal generated by a reflection of the transmission signal, demodulating the echo signal to obtain demodulated information, identifying the demodulated information by using a target network model to obtain an identification result of the echo signal, and outputting the identification result to a graphical user interface for display.

16 Claims, 11 Drawing Sheets

(56)             References Cited

FOREIGN PATENT DOCUMENTS

| CN | 111603138 A | * | 9/2020 | ........... A61B 5/1135 |
|----|-------------|---|--------|------------------------|
| CN | 111839498 A |   | 10/2020 |                       |
| CN | 111990968 A |   | 11/2020 |                       |
| CN | 112137604 A |   | 12/2020 |                       |
| CN | 112244863 A |   | 1/2021 |                        |

OTHER PUBLICATIONS

Zhao, Peijin , "Heart Rate Sensing with a Robot Mounted mmWave Radar", 2020 IEEE International Conference on Robotics and Automation (ICRA), Paris France, Aug. 31, 2020, 7 pp.

* cited by examiner

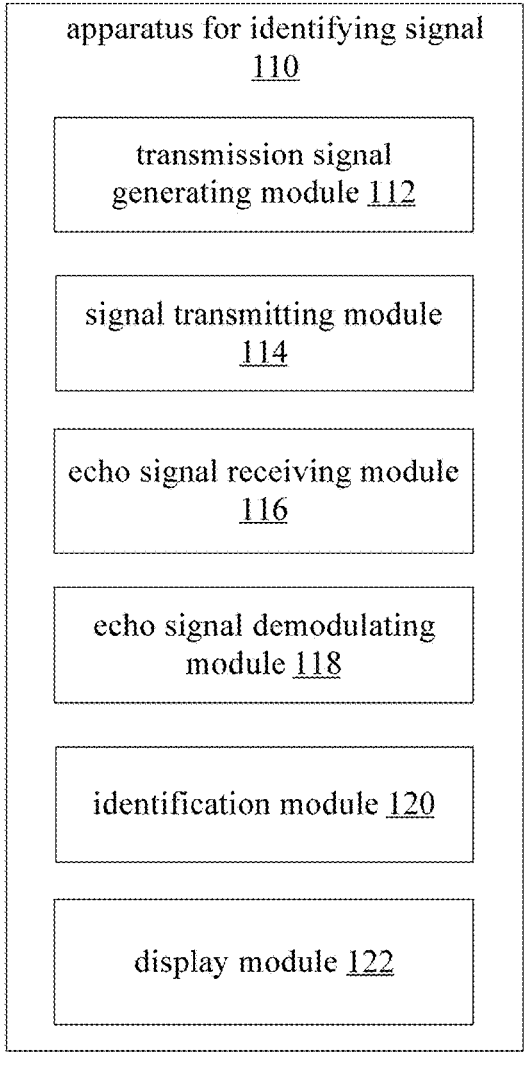

apparatus for identifying signal
110 transmission signal
generating module 112 signal transmitting module
114 echo signal receiving module
116 echo signal demodulating
module 118 identification module 120 display module 122

Fig. 3

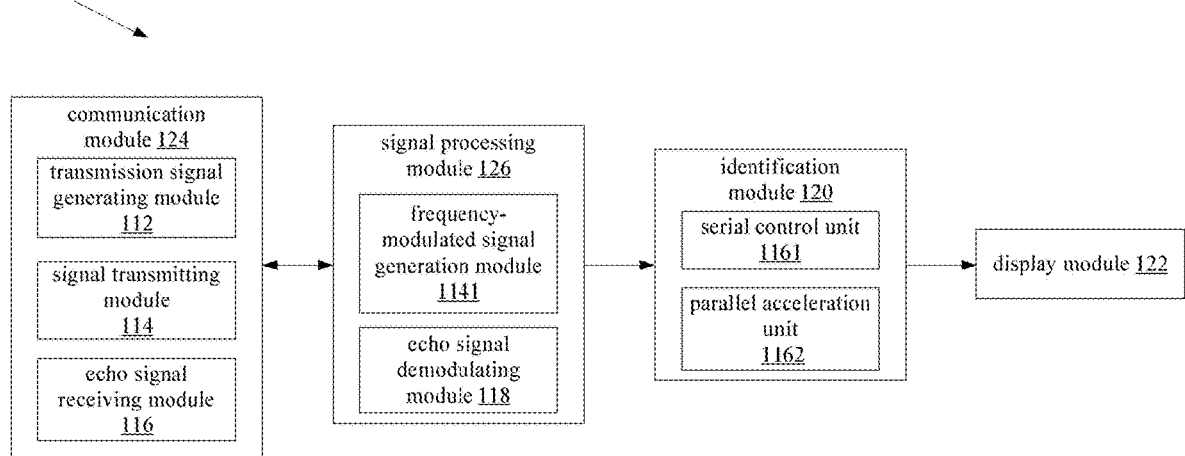

110 communication
module 124 transmission signal
generating module
112 signal transmitting
module
114 echo signal
receiving module
116 signal processing
module 126 frequency-
modulated signal
generation module
1141 echo signal
demodulating
module 118 identification
module 120 serial control unit
1161 parallel acceleration
unit
1162 display module 122

Fig. 4

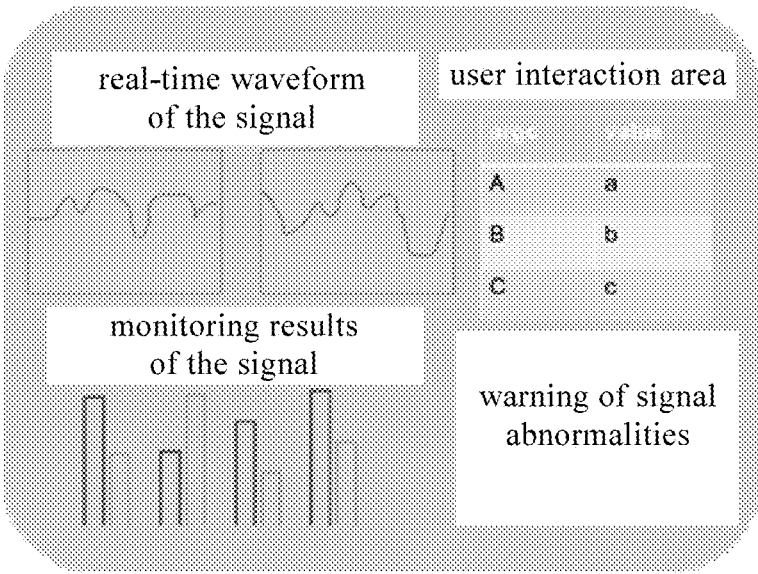

Fig. 5

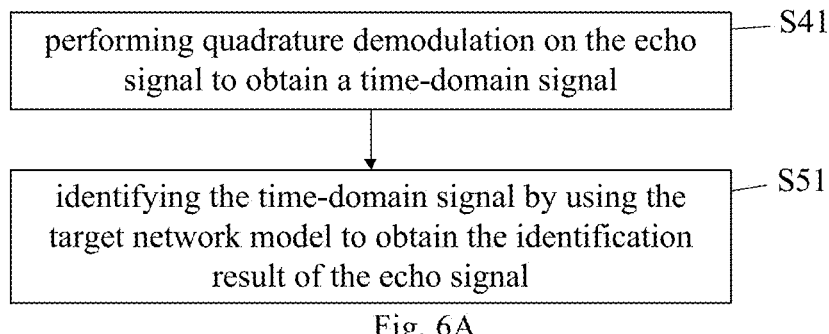

performing quadrature demodulation on the echo signal to obtain a time-domain signal — S41 identifying the time-domain signal by using the target network model to obtain the identification result of the echo signal — S51

Fig. 6A

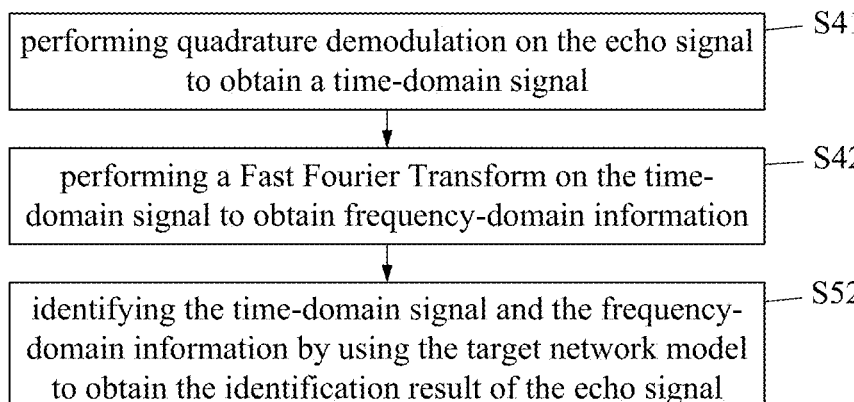

performing quadrature demodulation on the echo signal to obtain a time-domain signal — S41 performing a Fast Fourier Transform on the time-domain signal to obtain frequency-domain information — S42 identifying the time-domain signal and the frequency-domain information by using the target network model to obtain the identification result of the echo signal — S52

Fig. 6B

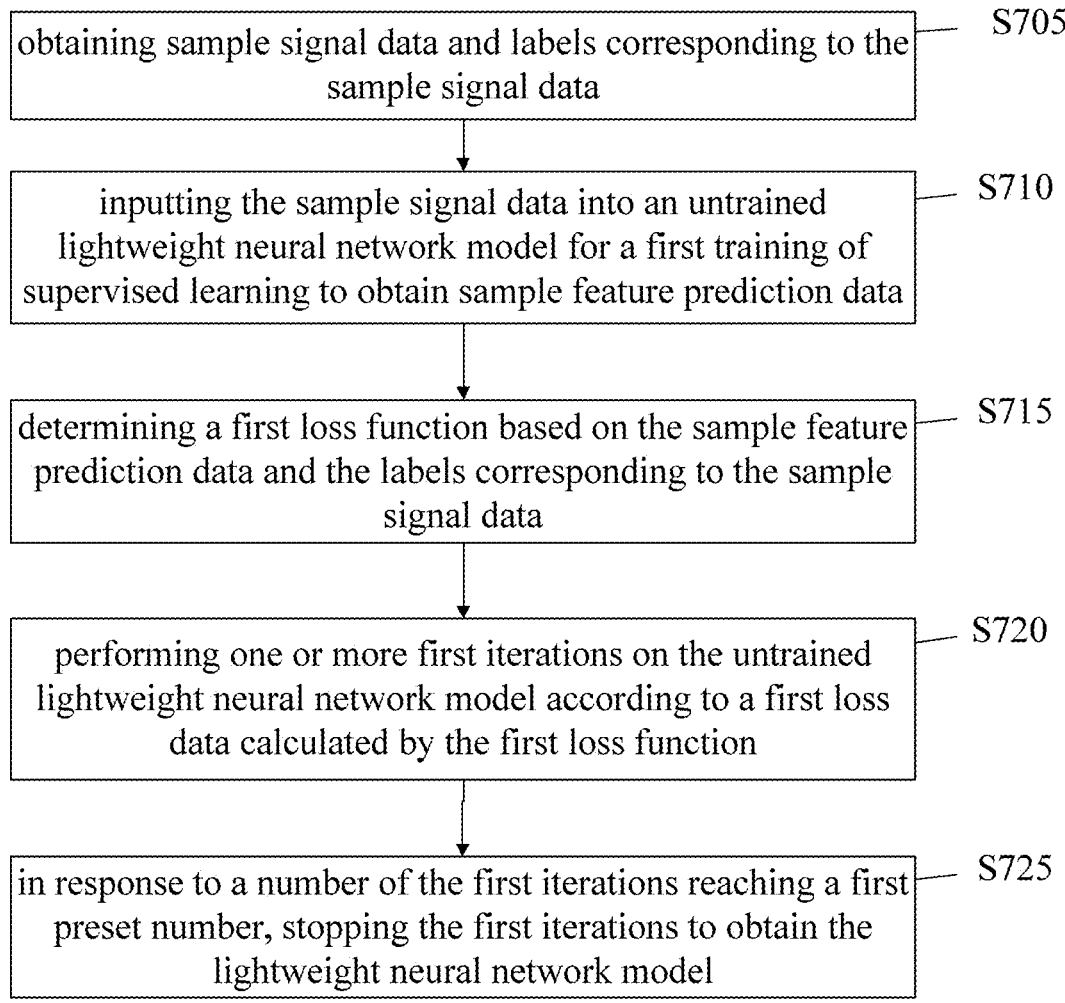

obtaining sample signal data and labels corresponding to the sample signal data — S705 inputting the sample signal data into an untrained lightweight neural network model for a first training of supervised learning to obtain sample feature prediction data — S710 determining a first loss function based on the sample feature prediction data and the labels corresponding to the sample signal data — S715 performing one or more first iterations on the untrained lightweight neural network model according to a first loss data calculated by the first loss function — S720 in response to a number of the first iterations reaching a first preset number, stopping the first iterations to obtain the lightweight neural network model — S725

Fig. 9

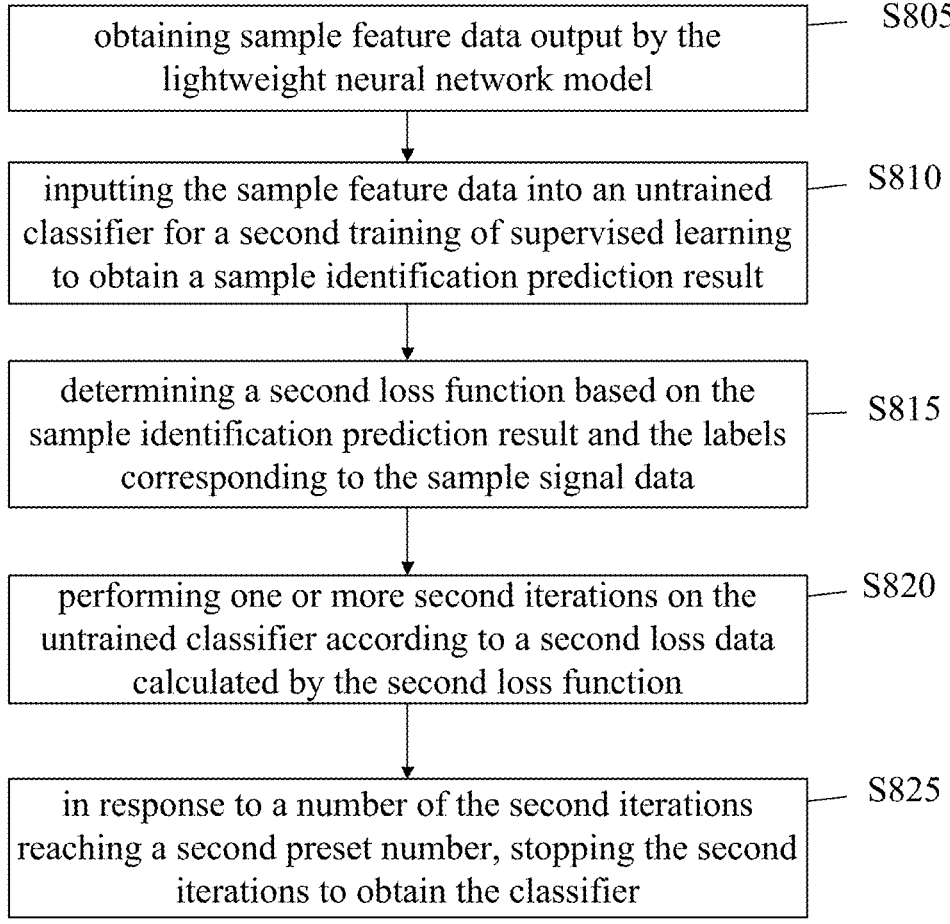

obtaining sample feature data output by the lightweight neural network model — S805 inputting the sample feature data into an untrained classifier for a second training of supervised learning to obtain a sample identification prediction result — S810 determining a second loss function based on the sample identification prediction result and the labels corresponding to the sample signal data — S815 performing one or more second iterations on the untrained classifier according to a second loss data calculated by the second loss function — S820 in response to a number of the second iterations reaching a second preset number, stopping the second iterations to obtain the classifier — S825

Fig. 11

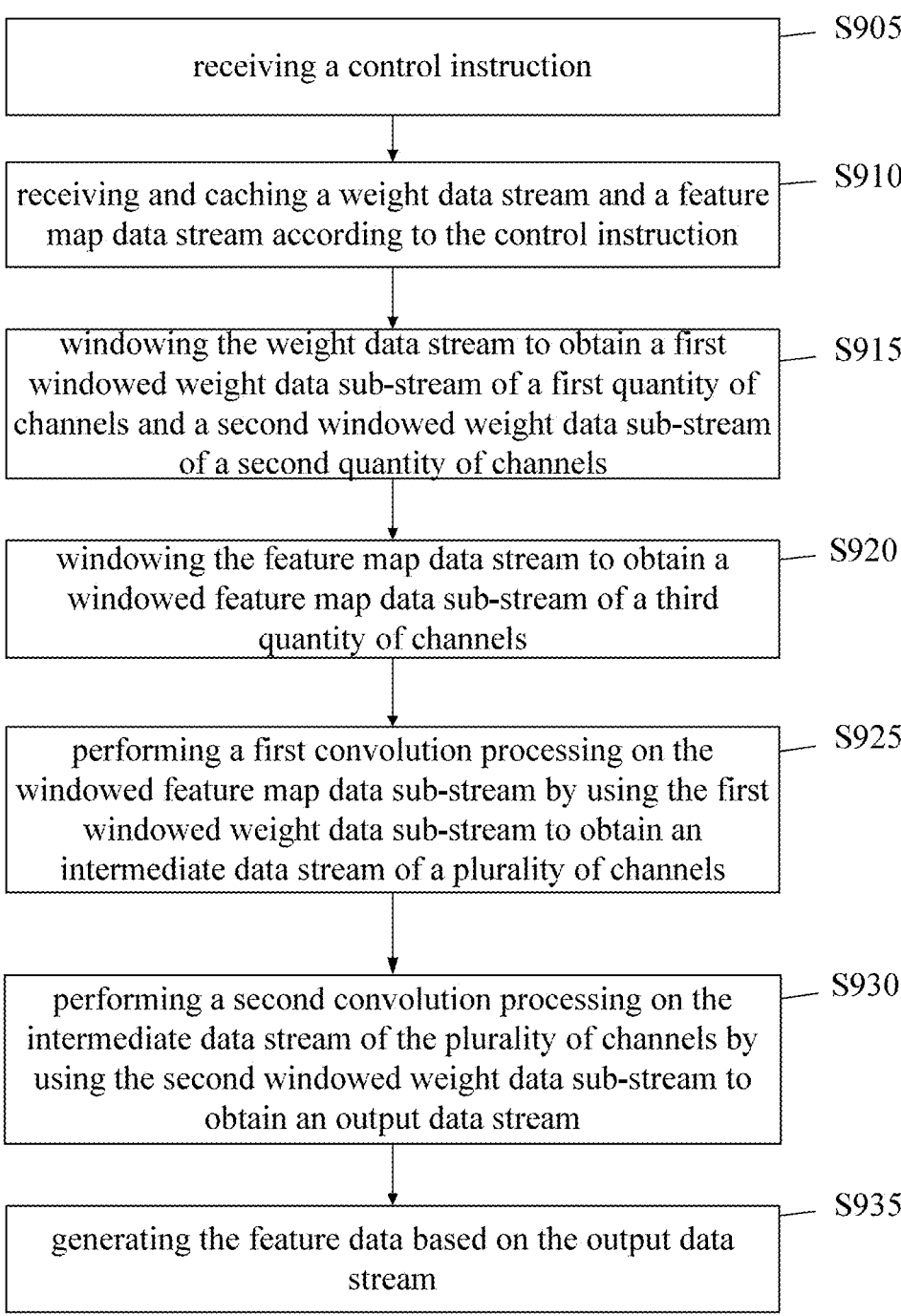

receiving a control instruction — S905 receiving and caching a weight data stream and a feature map data stream according to the control instruction — S910 windowing the weight data stream to obtain a first windowed weight data sub-stream of a first quantity of channels and a second windowed weight data sub-stream of a second quantity of channels — S915 windowing the feature map data stream to obtain a windowed feature map data sub-stream of a third quantity of channels — S920 performing a first convolution processing on the windowed feature map data sub-stream by using the first windowed weight data sub-stream to obtain an intermediate data stream of a plurality of channels — S925 performing a second convolution processing on the intermediate data stream of the plurality of channels by using the second windowed weight data sub-stream to obtain an output data stream — S930 generating the feature data based on the output data stream — S935

+1. 8V/2A input voltage voltage conversion transmitting and receiving device

PCIE_TX7_P/N
PCIE_TX6_P/N
PCIE_TX5_P/N
PCIE_TX4_P/N
PCIE_TX3_P/N
PCIE_TX2_P/N
PCIE_TX1_P/N
PCIE_TX0_P/N

PCIE_RX7_P/N
PCIE_RX6_P/N
PCIE_RX5_P/N
PCIE_RX4_P/N
PCIE_RX3_P/N
PCIE_RX2_P/N
PCIE_RX1_P/N
PCIE_RX0_P/N

BANK13

PCIE_RESET

METHOD, APPARATUS, COMPUTING DEVICE AND COMPUTER-READABLE STORAGE MEDIUM FOR IDENTIFYING SIGNAL

RELATED APPLICATIONS

This application claims priority to and the benefit of Chinese Patent Application No. 202110351582.8, filed on Mar. 31, 2021, the content of which is incorporated in its entirety herein by reference.

FIELD

This application relates to the field of signal detection, and in particular to a method, an apparatus, a computing device, and a computer-readable storage medium for identifying a signal.

BACKGROUND

In related technologies, the identification of vital signs of a living body mainly relies on contact style signal detection apparatuses that are attached to the living body, such as sensors, electrodes, etc., to obtain relevant information. However, the use of the contact style signal detection apparatuses are restricted at a relatively high degree in the clinical dynamic monitoring of infectious disease patients, severely burned patients, elderly people, and infants.

Also, in related technologies, a signal identification model based on deep learning can be used to identify signals. However, the construction of such a signal identification model based on deep learning requires a large amount of parameters, and the complexity of the model is relatively high, such that the model has a large computational load and low identification efficiency. Therefore, it is often necessary to install such a model into large-scale hardware devices, instead of portable devices which has relatively weak computing capacity. This leads to poor flexibility in the detection of vital signs.

SUMMARY

According to an aspect of this application, there is provided a method for identifying a signal, comprising: demodulating a modulated signal to generate a transmission signal; transmitting the transmission signal; receiving an echo signal generated by a reflection of the transmission signal; demodulating the echo signal to obtain demodulated information; identifying the demodulated information by using a target network model to obtain an identification result of the echo signal; and outputting the identification result to a graphical user interface for display.

In some embodiments, demodulating the echo signal to obtain the demodulated information comprises: performing quadrature demodulation on the echo signal to obtain a time-domain signal. Also, identifying the demodulated information by using the target network model to obtain the identification result of the echo signal comprises: identifying the time-domain signal by using the target network model to obtain the identification result of the echo signal.

In some embodiments, demodulating the echo signal to obtain the demodulated information comprises: performing quadrature demodulation on the echo signal to obtain a time-domain signal and performing a Fast Fourier Transform on the time-domain signal to obtain frequency-domain information. Also, identifying the demodulated information by using the target network model to obtain the identification result of the echo signal comprises: identifying the time-domain signal and the frequency-domain information by using the target network model to obtain the identification result of the echo signal.

In some embodiments, demodulating the echo signal to obtain the demodulated information comprises: performing quadrature demodulation on the echo signal to obtain a time-domain signal; and performing a Fast Fourier Transform on the time-domain signal to obtain frequency-domain information. Also, identifying the demodulated information by using the target network model to obtain the identification result of the echo signal comprises: identifying the frequency-domain information by using the target network model to obtain the identification result of the echo signal.

In some embodiments, the target network model comprises a lightweight neural network model and a classifier, and identifying the demodulated information by using the target network model to obtain the identification result of the echo signal comprises: inputting the demodulated information into the lightweight neural network model to obtain feature data; and inputting the feature data into the classifier to obtain the identification result.

In some embodiments, the lightweight neural network model is trained training by following steps: obtaining sample signal data and labels corresponding to the sample signal data; inputting the sample signal data into an untrained lightweight neural network model for a first training of supervised learning to obtain sample feature prediction data; determining a first loss function based on the sample feature prediction data and the labels corresponding to the sample signal data; performing one or more first iterations on the untrained lightweight neural network model according to a first loss data calculated by the first loss function; in response to a number of the first iterations reaching a first preset number, stopping the first iterations to obtain the lightweight neural network model.

In some embodiments, the classifier is trained by following steps: obtaining sample feature data output by the lightweight neural network model; inputting the sample feature data into an untrained classifier for a second training of supervised learning to obtain a sample identification prediction result; determining a second loss function based on the sample identification prediction result and the labels corresponding to the sample signal data; performing one or more second iterations on the untrained classifier according to a second loss data calculated by the second loss function; in response to a number of the second iterations reaching a second preset number, stopping the second iterations to obtain the classifier.

In some embodiments, inputting the demodulated information into the lightweight neural network model to obtain the feature data comprises: receiving a control instruction; receiving and caching a weight data stream and a feature map data stream according to the control instruction; windowing the weight data stream to obtain a first windowed weight data sub-stream of a first quantity of channels and a second windowed weight data sub-stream of a second quantity of channels; windowing the feature map data stream to obtain a windowed feature map data sub-stream of a third quantity of channels, wherein the third quantity is equal to the first quantity; performing a first convolution processing on the windowed feature map data sub-stream by using the first windowed weight data sub-stream to obtain an intermediate data stream of a plurality of channels; performing a second convolution processing on the intermediate data stream of the plurality of channels by using the second windowed weight data sub-stream to obtain an output data stream; generating the feature data based on the output data stream.

According to another aspect of this application, there is provided an apparatus for identifying a signal. The apparatus comprises a transmission signal generating module, configured to demodulate a modulated signal to generate a transmission signal; a signal transmitting module, configured to transmit the transmission signal; an echo signal receiving module, configured to receive an echo signal generated by a reflection of the transmission signal; an echo signal demodulating module, configured to demodulate the echo signal to obtain demodulated information; an identification module, configured to identify the demodulated information by using a target network model to obtain an identification result of the echo signal; a display module, configured to output the identification result to a graphical user interface for display.

In some embodiments, the echo signal demodulating module is configured to perform quadrature demodulation on the echo signal to obtain a time-domain signal.

In some embodiments, the echo signal demodulating module is configured to perform a Fast Fourier Transform on the time-domain signal to obtain frequency-domain information.

In some embodiments, the identification module comprises a serial control unit and a parallel acceleration unit, wherein the serial control unit is configured to control the parallel acceleration unit, and the parallel acceleration unit is configured to achieve a parallel convolution calculation.

In some embodiments, the serial control unit comprises a flow control sub-unit, a weight data sub-unit, a pooling function sub-unit, and an activation function sub-unit.

In some embodiments, the parallel acceleration unit comprises an instruction control sub-unit, a cache sub-unit, a weight window generation sub-unit, a feature map window generation sub-unit, a convolution sub-unit, an output cache sub-unit, and an output sub-unit.

In some embodiments, the identification module further comprises a classification unit, wherein the classification unit is configured to identify the demodulated information to obtain the identification result of the echo signal.

According to another aspect of this application, there is provided a computing device, comprising: a memory configured to store computer-executable instructions; and a processor configured to execute the computer-executable instructions to cause the computing device to perform the method according to any of the embodiments of this application.

According to another aspect of this application, there is provided a computer-readable storage medium, comprising computer-executable instructions that when executed by a processor of a computing device cause the processor to perform the method according to any of the embodiments of this application.

BRIEF DESCRIPTION OF THE DRAWINGS

By reading the detailed description of the non-limiting embodiments with reference to the following drawings, other features, purposes and advantages of the present application will become more apparent.

FIG. 3 schematically shows a structural block diagram of an apparatus for identifying a signal according to an embodiment of the present application.

FIG. 4 schematically shows a signal flow diagram inside an apparatus for identifying a signal according to an embodiment of the present application.

FIG. 5 schematically shows an exemplary display image of a graphical user interface of a display module.

FIG. 6A-6C schematically show a flowchart of a method for identifying a signal according to an embodiment of the present application.

FIG. 9 schematically shows a flowchart of a process of training a lightweight neural network model according to an embodiment of the present application.

FIG. 11 schematically shows a flowchart of a process of training a classifier according to an embodiment of the present application.

FIG. 13 schematically shows a flowchart of a method for identifying a signal according to an embodiment of the present application.

DETAILED DESCRIPTION OF THE EMBODIMENTS

Figure 1:
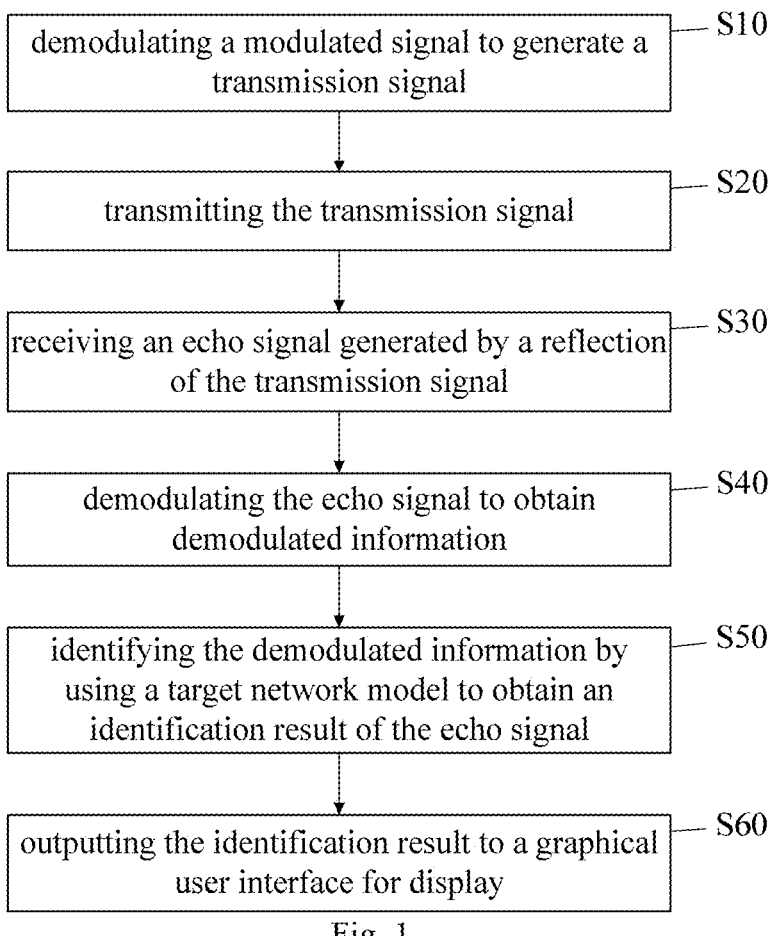
FIG. 1 schematically shows a flowchart of a method for identifying a signal according to an embodiment of the present application.

The embodiments of the present application are described in detail below. Examples of the embodiments are shown in the accompanying drawings, in which the same or similar reference numerals indicate the same or similar elements or elements with the same or similar functions. The following embodiments described with reference to the drawings are exemplary, and are only used to explain the present application, and cannot be understood as a limitation to the present application.

FIG. 1 schematically shows a flowchart of a method for identifying a signal according to an embodiment of the present application. As shown in FIG. 1, this method comprises the following steps:

at step S10, demodulating a modulated signal to generate a transmission signal;

at step S20, transmitting the transmission signal;

at step S30, receiving an echo signal generated by a reflection of the transmission signal;

at step S40, demodulating the echo signal to obtain demodulated information;

at step S50, identifying the demodulated information by
using a target network model to obtain an identification
result of the echo signal;
at step S60, outputting the identification result to a graphi-
cal user interface for display.

Figure 2:
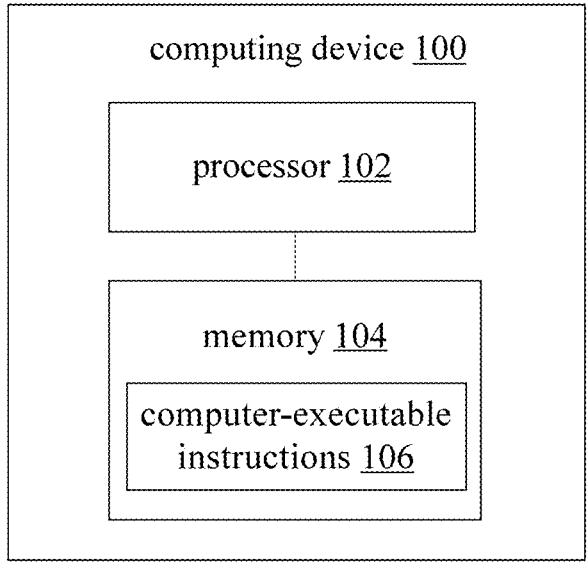
FIG. 2 schematically shows a structural block diagram of a computing device according to an embodiment of the present application.

FIG. 2 schematically shows a structural block diagram of
a computing device 100 according to an embodiment of the
present application. The computing device 100 comprises a
processor 102 and a memory 104. The memory 104 stores
computer-executable instructions 106. When the computer-
executable instructions 106 are executed by the processor
102, they cause the computing device 100 to execute the
method for identifying a signal according to the embodiment
of the present application. More specifically, the processor
102 may be used to demodulate the modulated signal to
generate a transmission signal, transmit the transmission
signal, receive the echo signal generated by the reflection of
the transmission signal, demodulate the echo signal to obtain
demodulated information, identify the demodulated infor-
mation by using a target network model to obtain an
identification result of the echo signal, and output the
identification result to the graphical user interface for dis-
play.

FIG. 3 schematically shows a structural block diagram of
an apparatus for identifying a signal 110 according to an
embodiment of the present application. The method for
identifying a signal according to the embodiment of the
present application can be implemented by the apparatus for
identifying a signal 110. The apparatus for identifying a
signal 110 comprises a transmission signal generating mod-
ule 112, a signal transmitting module 114, an echo signal
receiving module 116, an echo signal demodulating module
118, an identification module 120, and a display module 122.
The step S10 of the method for identifying a signal accord-
ing to the embodiment of the present application can be
implemented by the transmission signal generating module
112. The step S20 can be implemented by the signal trans-
mitting module 114. The step S30 can be implemented by
the echo signal receiving module 116. The step S40 can be
implemented by the echo signal demodulating module 118.
The step S50 can be implemented by the identification
module 120. The step S60 may be implemented by the
display module 122. That is, the transmission signal gener-
ating module 112 is configured to demodulate a modulated
signal to generate a transmission signal, the signal transmit-
ting module 114 is configured to transmit the transmission
signal, the echo signal receiving module 116 is configured to
receive an echo signal generated by a reflection of the
transmission signal, the echo signal demodulating module
118 is configured to demodulate the echo signal to obtain
demodulated information, the identification module 120 is
configured to identify the demodulated information by using
a target network model to obtain the identification result of
the echo signal, and the display module 122 is configured to
output the identification result to the graphical user interface
for display.

Specifically, the transmission signal generating module
may generate a linear frequency modulation pulse. Different
from the regular pulse signal with fixed frequency, the signal
frequency of the linear frequency modulation pulse
increases linearly with time. After the linear frequency-
modulated signal is generated, the linear frequency-modu-
lated signal is modulated and demodulated to a predeter-
mined signal frequency and transmitted to the object to be
measured. In some embodiments, the object to be measured
may be a living body, in particular, a living body whose vital
signs may be reflected by the movement of the body surface.

6

According to the Doppler effect, when an object moves
toward or away from a signal transmitting and receiving
device, the frequency and phase of the linear frequency
modulation pulse reflected by the object will change. Since
the wavelength of the pulse signal is very short (for example,
within 4 mm), any small change of the object (even a
movement less than 1 mm) will cause a large phase change
of the signal. The small frequency changes are not easy to be
detected, while large phase changes are easier to be detected.
Therefore, the phase information can be used to detect the
speed of the object's movement. To determine the speed of
the object, multiple linear frequency modulation pulses are
used, and the phase difference between the continuously
reflected linear frequency modulation pulses is recorded,
and the speed is calculated based on it. In the scenario of
detecting vital signs, when a linear frequency modulation
pulse is transmitted to a body part (for example, the chest
area) of the living body to be measured, due to the move-
ment of the body part (for example, the movement of the
chest, which may be caused by heartbeat and/or breathing),
the reflected signal is phase modulated. The signal trans-
mitting module sends multiple linear frequency modulation
pulses according to a predetermined time interval. Each echo
pulse can experience a distance Fast Fourier Transform
(FFT). By selecting the distance level corresponding to the
position of the body part, each linear frequency modulation
pulse will record the signal phase in the selected distance
level. From this, the phase change is calculated, and thus all
the motion components of the motion are derived. By
performing Doppler FFT to perform spectral analysis on the
obtained motion components, various components can be
resolved. After a period of testing, the vital signs of living
bodies can be determined by analyzing the movement of
body parts.

After receiving the echo signal of the transmission signal,
the echo signal is demodulated to obtain demodulated infor-
mation, and a trained target network model is used to
identify the demodulated information to obtain the identifi-
cation result, and then the identification result is output to
the graphical user interface for display.

FIG. 4 schematically shows a diagram of the signal flow
inside an apparatus for identifying a signal according to an
embodiment of the present application. As shown in FIG. 4,
the apparatus for identifying a signal 110 comprises a
communication module 124, a signal processing module
126, an identification module 120, and a display module
122. The transmission signal generating module 112, the
signal transmitting module 114, and the echo signal receiv-
ing module 116 may be integrated in the communication
module 124. The signal processing module 126 comprises
the echo signal demodulating module 118. In addition, the
signal processing module 114 may also comprise a fre-
quency-modulated signal generating module 1141. After the
linear frequency-modulated signal is generated by the fre-
quency-modulated signal generation module 1141, the linear
frequency-modulated signal is sent to the communication
module 124, and the transmission signal generating module
112 in the communication module 124 modulates and
demodulates the linear frequency-modulated signal to a
predetermined signal frequency, and then the resulting sig-
nal is transmitted to the object to be measured by the signal
transmitting module 114. The transmission signal is
reflected by the object to be measured to obtain the echo
signal, and thus the echo signal carries the information of the
measured object. The echo signal receiving module 116 of
the communication module 124 receives the echo signal, modulates it to a preset frequency, and transmits it to the signal processing module 126.

After the signal processing module 126 receives the echo signal of the transmission signal, it uses the echo signal demodulating module 118 therein to perform quadrature demodulation on the echo signal to obtain the time-domain signal. In some embodiments, the time-domain signal can be directly transmitted to the identification module 120, so that the subsequent operations can be performed solely based on the time-domain signal. In other embodiments, the time-domain signal is first converted into frequency-domain information through the Fast Fourier Transform, and then both the time-domain signal and frequency-domain information are transmitted to the identification module 120 for the subsequent operations. In other embodiments, the time-domain signal is first converted into frequency-domain information through the Fast Fourier Transform, and then the frequency-domain information is solely transmitted to the identification module 120 for the subsequent operations. The identification module 120 uses the trained target network model to identify the time-domain signal and/or the frequency-domain information to obtain the identification result, and transmit the identification result to the display module 122. Then, the display module 122 outputs the identification result to the graphical user interface for display.

In some more specific embodiments, the frequency-modulated signal generating module 1141 generates an intermediate frequency linear frequency-modulated signal. In the field of this application, the frequency range of the intermediate frequency linear frequency-modulated signal is generally 30 MHZ to 300 MHZ. For example, the frequency of the intermediate frequency signal may be 140 MHZ. Then, the transmission signal generating module 112 modulates the intermediate frequency linear frequency-modulated signal to the radio frequency. In the field of this application, the frequency of the radio frequency signal is 30 GHZ to 300 GHZ. For example, the frequency of the radio frequency signal may be 64 GHZ. Then, the signal transmitting module 114 sends the radio frequency transmission signal to the object to be measured, such as a living body. The transmission signal is reflected on the surface of the living body to be measured to obtain the echo signal. The echo signal carries the vital signs of the measured living body in the back transmission and the echo signal is received by the echo signal receiving module 116.

After receiving the echo signal of the transmission signal, the echo signal is frequency-converted, and the radio frequency echo signal is frequency-converted to obtain an intermediate frequency echo signal. Then, the intermediate frequency echo signal is transmitted to the echo signal demodulating module 118. The echo signal demodulating module 118 modulates and demodulates the intermediate frequency echo signal to obtain demodulated information such as the time-domain signal and the frequency-domain information. In the identification module 120, the trained target network model is used to identify the demodulated information to obtain the identification result. Then, the identification result is output to the display module 122, such as the graphical user interface of the terminal of the smart device for display.

In some embodiments, the communication module 124 has a total of four power supplies, which are 1.24 V digital circuit power supply, 1.24 V on-chip static random-access memory (SRAM) power supply, 1.8 V clock and input/output pin power supply, and 3.3 V digital input/output pin power supply. Among them, the clock input is a 40 MHz crystal oscillator, 3.3 V is the input power supply, and two power supplies of 1.24 V and 1.8 V are output through a linear power supply. In addition, the communication module 124 can reserve 2 groups of 60-pin extension interfaces for debugging.

FIG. 5 schematically shows an exemplary display image of the graphical user interface of the display module 122. The display module 122 can be designed using the QT programming environment. The displayed content may comprise the monitoring results of the signal, the real-time waveform of the signal, the warning of signal abnormalities and similar situations, and the user interaction area, etc., so as to realize the visual interaction between the apparatus for identifying a signal 110 and the user. The user can set the frequency of acquiring the signal, the time of acquiring the signal and other parameters through the user interaction area. The display module 122 implements simple configuration according to the parameters set by the user, and obtains data from the serial port to realize automatic identification of the serial port. The obtained signal data is sequentially identified according to the sending rule of the hardware device. After identification, the signal data is stored and the signal waveform and other graphics are drawn in real time. In addition, all signal data, signal identification result, signal waveform and other information can be saved as a file of a predetermined format, such as txt, which is convenient for users to view later.

In the method, apparatus, computing device and computer-readable storage medium for identifying a signal according to the embodiment of the present application, the demodulated information (for example, time-domain signal and/or frequency-domain information) is obtained according to the echo signal of the transmission signal, and the trained target network model is used to identify the demodulated information. This model can reduce the amount of parameters of the target network model, reduce the computational load of the target network model, and therefore improve the efficiency of signal identification. At the same time, the signal identification result can be displayed on the graphical user interface, which is convenient for users to understand relevant information and may optimize user experience.

It should be noted that the predetermined signal frequency used by the signal processing module 126 and the communication module 124 can be set based on the type of the object to be measured, the processor performance of the signal processing module 126 and the communication module 124, the application scenarios of the apparatus for identifying a signal 110, etc, which are not limited.

Figure 6C:
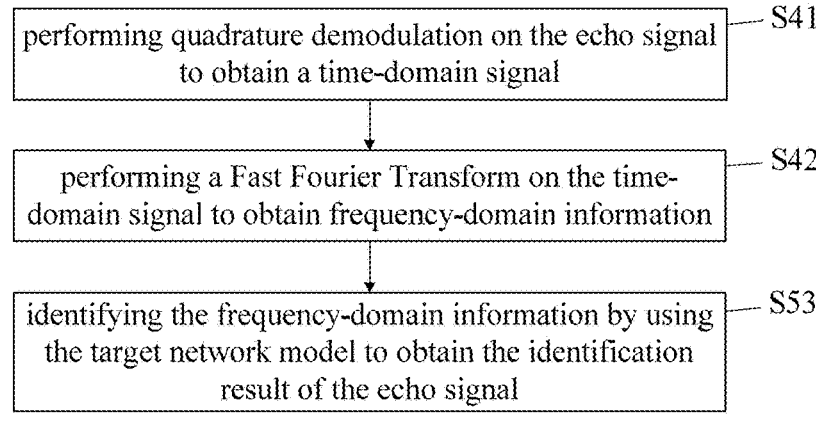

FIG. 6A-6C schematically show a flowchart of a method for identifying a signal according to an embodiment of the present application. In some embodiments, as shown in FIG. 6A, the step S40 comprises performing quadrature demodulation on the echo signal to obtain a time-domain signal (step S41). In addition, the step S50 comprises identifying the time-domain signal by using the target network model to obtain the identification result of the echo signal (step S51). In other embodiments, as shown in FIG. 6B, the step S40 comprises performing quadrature demodulation on the echo signal to obtain a time-domain signal (step S41) and performing a Fast Fourier Transform on the time-domain signal to obtain frequency-domain information (Step S42). In addition, the step S50 comprises identifying the time-domain signal and the frequency-domain information by using the target network model to obtain the identification result of the echo signal (step S52). In other embodiments, as shown in FIG. 6C, the step S40 comprises performing quadrature demodulation on the echo signal to obtain a time-domain signal (step S41) and performing a Fast Fourier Transform on the time-domain signal to obtain frequency-domain information (step S42). Meanwhile, the step S50 comprises identifying the frequency-domain information by using the target network model to obtain the identification result of the echo signal (step S53). According to the foregoing embodiments, it can be seen that there may be three specific implementations for the step S50 of identifying the demodulated information by using a target network model to obtain an identification result of the echo signal, that is, identifying only the time-domain signal, identifying both the time-domain signal and the frequency-domain information, and identifying only the frequency-domain information. In some other parts of this application, these three implementations can also be expressed as: identifying the time-domain signal and/or the frequency-domain information by using a target network model to obtain an identification result of the echo signal.

In some embodiments, steps S41 and S42 may be implemented by the echo signal demodulating module 118 of the signal processing module 126. In other words, the echo signal demodulating module 118 can be used to perform quadrature demodulation on the echo signal to obtain a time-domain signal, and in some cases, can also be used to perform a Fast Fourier Transform on the time-domain signal to obtain frequency-domain information.

In some embodiments, the processor 102 is used to perform quadrature demodulation on the echo signal to obtain a time-domain signal and to perform a Fast Fourier Transform on the time-domain signal to obtain frequency-domain information.

Specifically, after receiving the radio frequency echo signal and converting the radio frequency echo signal into an intermediate frequency echo signal, the quadrature demodulation is performed on the intermediate frequency echo signal. The demodulation process comprises mixing the intermediate frequency echo signal and the local oscillator signal, and inputting the resulting signal into the cascaded FIR low-pass filter to obtain two orthogonal signal components, that is, the time-domain signal. In some embodiments, Fast Fourier Transform is performed on the time-domain signal to obtain the frequency-domain information of the echo signal of the measured object.

Figure 7:
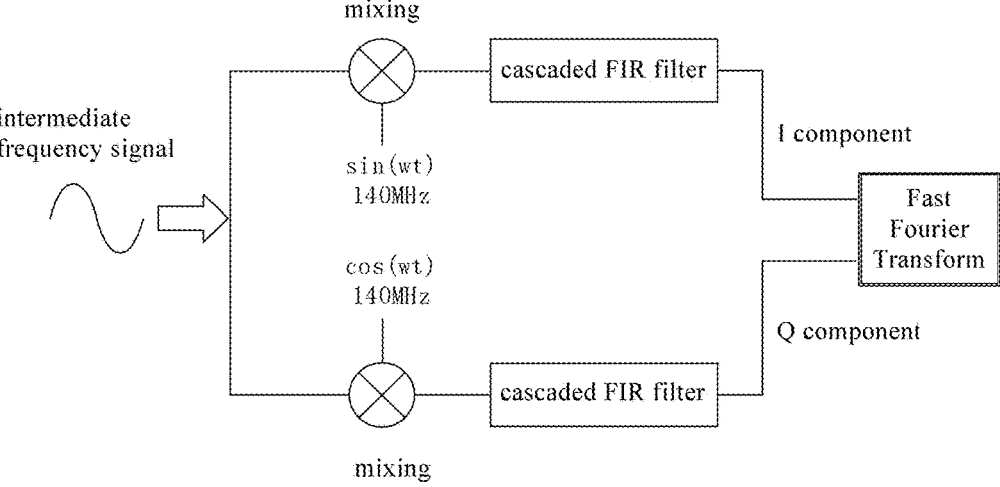
FIG. 7 schematically shows a signal processing process according to an embodiment of the present application.

FIG. 7 schematically shows the process of obtaining time-domain signal and frequency-domain information based on the intermediate frequency echo signal. As shown in FIG. 7, the radio frequency echo signal is demodulated to obtain an intermediate frequency echo signal of 30 MHz to 300 MHz (for example, 140 MHZ), and then the intermediate frequency echo signal is mixed with the local oscillator signal and the mixed signal is input into the cascaded FIR low-pass filter to obtain two orthogonal signal components, namely the time-domain signal. Then, the time-domain signal is input into the Fast Fourier Transform module for performing the Fast Fourier Transform to obtain the frequency-domain information of the echo signal of the measured object.

Furthermore, according to the requirements of the target network model, after demodulating the echo signal, the time-domain signal can be output solely, the frequency-domain information can also be output solely, or the time-domain signal and the frequency-domain information can be output together, as the input data of the target network model, which is not limited here.

Figure 8:
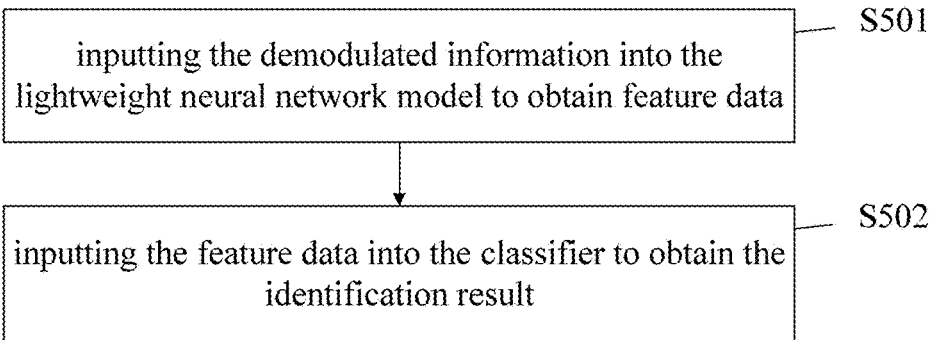
FIG. 8 schematically shows a flowchart of a method for identifying a signal according to an embodiment of the present application.

FIG. 8 schematically shows a flowchart of a method for identifying a signal according to an embodiment of the present application. As shown in FIG. 8, in some embodiments, the target network model comprises a lightweight neural network model and a classifier, and the step S50 comprises:

at step S501: inputting the demodulated information into the lightweight neural network model to obtain feature data; and at step S502: inputting the feature data into the classifier to obtain the identification result.

In some embodiments, the steps S501 and S502 may be implemented by the identification module 120. That is, the identification module 120 can be used to input the time-domain signal and/or frequency-domain information into the lightweight neural network model to obtain feature data, and input the feature data into the classifier to obtain the identification result.

In some embodiments, the processor 102 is used to input the time-domain signal and/or frequency-domain information into a lightweight neural network model to obtain feature data, and to input the feature data into a classifier to obtain an identification result.

Specifically, the trained target network model can be used to identify the time-domain signal and/or frequency-domain information. The target network model comprises a lightweight neural network model and a classifier. The lightweight neural network model is used to process the time-domain signal and/or frequency-domain information to output feature data. The classifier is used to process the feature data to output the identification result.

The network structure of a conventional deep learning algorithm is relatively complicated. The quantity of the network parameters and the complexity of the model are relatively high. When deploying algorithm into hardware in this application, a lightweight neural network model is used. The lightweight neural network model can automatically extract the features of signal data, and the classifier can use the classification algorithm in ensemble learning to realize the classification function. Examples of classifier models comprise but are not limited to xgboost network, long short-term memory (LSTM) network, gated recurrent unit (GRU), time delay neural network (TDNN), convolutional neural network (CNN), random forest classifier, LightGBM classifier, etc.

In the training process, the lightweight neural network model and the classifier can be trained separately or together. First, the sample signal data is input into the untrained lightweight network for training. During the training process, the output data of the lightweight network being trained is sample feature prediction data. After the training is completed, the trained lightweight network outputs sample feature data. At this point, compared to the original input signal data, the feature data is more abstract and has a lower dimension.

In some embodiments, xgboost is selected as the classifier of the entire model, because the xgboost algorithm has a better classification effect on low-dimensional data than deep learning. After the sample feature extraction is completed, the sample feature data is input into the xgboost algorithm model for training. After the training is completed, a classifier with higher identification accuracy can be obtained.

In this way, it is possible to ensure the accuracy of signal identification while improving the efficiency of signal identification.

FIG. 9 schematically shows a flowchart of a process of training a lightweight neural network model according to an embodiment of the present application. As shown in FIG. 9, in some embodiments, the lightweight neural network model is trained by the following steps:

at step S705, obtaining sample signal data and labels corresponding to the sample signal data;

at step S710, inputting the sample signal data into an untrained lightweight neural network model for a first training of supervised learning to obtain sample feature prediction data;

at step S715, determining a first loss function based on the sample feature prediction data and the labels corresponding to the sample signal data;

at step S720, performing one or more first iterations on the untrained lightweight neural network model according to a first loss data calculated by the first loss function;

at step S725, in response to a number of the first iterations reaching a first preset number, stopping the first iterations to obtain the lightweight neural network model.

In some embodiments, the above steps may be implemented by the identification module 120. That is, the identification module 120 can be used to obtain sample signal data and labels corresponding to the sample signal data; input the sample signal data into an untrained lightweight neural network model for a first training of supervised learning to obtain sample feature prediction data; determine a first loss function based on the sample feature prediction data and the labels corresponding to the sample signal data; perform one or more first iterations on the untrained lightweight neural network model according to a first loss data calculated by the first loss function; and in response to a number of the first iterations reaching a first preset number, stopping the first iterations to obtain the lightweight neural network model.

In some embodiments, the above steps may be implemented by the processor 102. That is, the processor 102 can be used to obtain sample signal data and labels corresponding to the sample signal data; input the sample signal data into an untrained lightweight neural network model for a first training of supervised learning to obtain sample feature prediction data; determine a first loss function based on the sample feature prediction data and the labels corresponding to the sample signal data; perform one or more first iterations on the untrained lightweight neural network model according to a first loss data calculated by the first loss function; and in response to a number of the first iterations reaching a first preset number, stopping the first iterations to obtain the lightweight neural network model.

Specifically, the lightweight neural network model can be implemented by depthwise separable convolution. Compared with the standard convolution, the depthwise separable convolution reduces the calculation amount and parameter amount of the network model by changing the calculation method of the convolution. Depthwise separable convolution decomposes the conventional convolutional layers into depthwise convolution and pointwise convolution. Depthwise convolution is a channel-based convolution operation, and each convolution kernel (also called as filter) corresponds to an input channel. The pointwise convolution uses 1×1 convolution kernels to merge the input channels.

Figure 10:
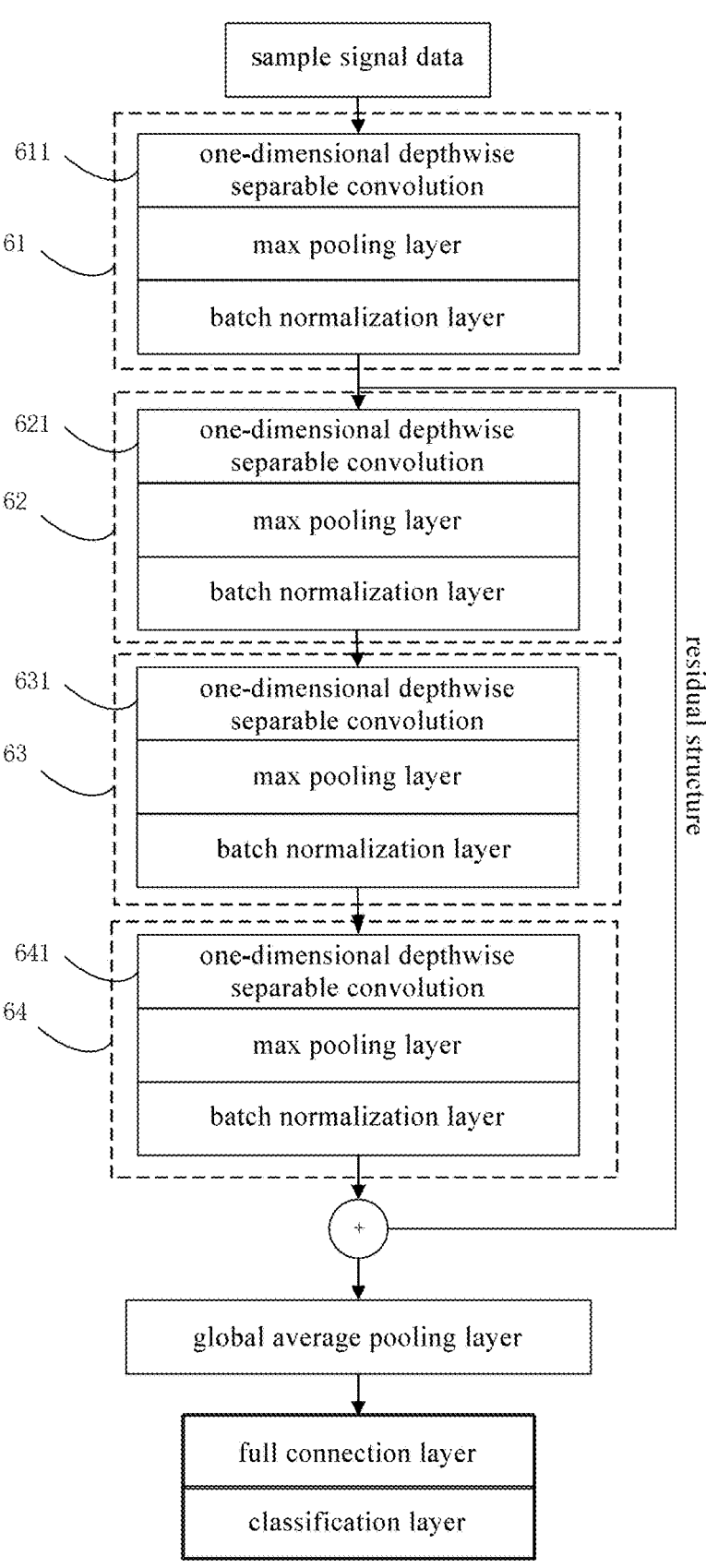
FIG. 10 schematically shows a network structure of a target network model according to an embodiment of the present application.

FIG. 10 schematically shows a network structure of a target network model according to an embodiment of the present application. In some embodiments, the lightweight neural network model of the target network model comprises multiple depthwise separable sub-networks. FIG. 10 shows an embodiment in which the lightweight neural network model comprises four depthwise separable sub-networks. As shown in FIG. 10, the lightweight neural network model comprises a first depthwise separable sub-network 61, a second depthwise separable sub-network 62, a third depthwise separable sub-network 63, and a fourth depthwise separable sub-network 64.

Each depthwise separable sub-network may comprise a one-dimensional depthwise separable convolutional layer, a max pooling layer, and a batch normalization layer. In the one-dimensional depthwise separable convolutional layer 611, the one-dimensional depthwise separable convolutional layer 621, the one-dimensional depthwise separable convolutional layer 631, and the one-dimensional depthwise separable convolutional layer 641, the channel-based depthwise convolution operation is first performed. For example, a convolution processing (e.g., a first convolution processing) is performed on the windowed feature map data sub-stream by using a windowed weight data sub-stream (e.g., a first windowed weight data sub-stream) to obtain an intermediate data stream of a plurality of channels. The first windowed weight data sub-stream is a windowed convolution kernel obtained by windowing the weight data stream, which has a first quantity of channels. The windowed feature map data sub-stream is a windowed data stream obtained by windowing the feature map data stream, which has a third quantity of channels. In depthwise convolution, the third quantity is equal to the first quantity, that is, the number of channels of the feature map data stream and the number of convolutional layers of the weight data stream are the same. Each convolution kernel corresponds to an input channel. After depthwise convolution, the windowed feature map data sub-stream can be converted into an intermediate data stream of a plurality of channels. Then, in the pointwise convolution, 1×1 convolution kernels are used in the convolution with the corresponding intermediate data stream, and the resulting maps are merged. Specifically, the signal data to be identified, which is acquired by the lightweight neural network model, is one-dimensional sequence data, with the corresponding channel number of 1. Therefore, in the one-dimensional depthwise separable convolutional layer 611 of the first depthwise separable convolution sub-network 61, the single-channel depthwise convolution operation is performed first, and then the pointwise convolution is performed. Since the number of input channel is 1, it can be considered that the feature data before and after the pointwise convolution are the same. Then, the number of input channels of the one-dimensional depthwise separable convolutional layer 621 is the number of output channels of the max pooling layer of the first depthwise separable convolutional sub-network 61. By analogy, for two adjacent one-dimensional depthwise separable convolutional layers, the number of input channels of the later one-dimensional depthwise separable convolutional layer is the number of the output channels of the max pooling layer of the former one-dimensional depthwise separable convolutional layer.

The depthwise separable convolution reduces the amount of calculation and parameters of the network model without affecting the feature extraction effect by changing the convolution calculation method. Therefore, a lightweight neural network model can be generated by using the depthwise separable convolutional layer.

During training, the sample signal data obtained by the untrained lightweight neural network model can comprises the signal data that has been obtained. The labels corresponding to the sample signal data can include the actual category corresponding to the signal data that has been obtained. In addition, the sample signal data and the label corresponding to the sample signal data can also be obtained from the open source data set.

In some embodiments, the sample signal data is the signal data of vital signs of the living body, such as the heart rate signal data. The heart rate signal data may be a one-dimensional sequence of heart rate data within a period of time that has been collected according to a certain collection frequency. The labels corresponding to the sample signal data are normal, atrial fibrillation, other abnormal rhythms, noise, etc.

In other embodiments, if the sample signal data does not have a corresponding label, it can be manually labeled. For example, a certain amount of heart rate signal data can be randomly selected as sample signal data from the obtained heart rate signal data, and then the category corresponding to each heart rate signal data can be labeled to generate the heart rate signal data and the labels corresponding to the heart rate signal data.

Further, after the sample signal data is collected, the sample signal data can be pre-processed, such as denoising, normalization, and cutting the sample signal data into pre-determined lengths. Then, the sample signal data is distributed to the training set and test set of the lightweight neural network model according to a predetermined ratio. The predetermined length of the sample signal data can be determined according to parameters such as the type, structure, and application of the lightweight neural network model. The predetermined ratio can be determined according to parameters such as the type and structure of the lightweight neural network model. For example, it can be 6:4, 7:3, or 5:5, etc., which is not specifically limited. The training set is used to train the lightweight neural network model, and the test set is used to optimize the lightweight neural network model.

It can be understood that, the more the number of sample signal data, the more accurate the training result of the model would be, but at the same time, the longer the training time would be. Specifically, the appropriate number of sample signal data can be determined according to factors such as the application scenario of the lightweight network neural model and the user's needs, such as 1000, 3000, 5000, 8000, 10000, etc.

Then, the sample signal data and the labels corresponding to sample signal data are used to perform a training of supervised learning on the untrained lightweight neural network model to obtain a pre-trained lightweight neural network model. The lightweight neural network model can comprise one-dimensional depthwise separable convolutional layers, maximum pooling layers, batch normalization layers, global average pooling layers, full connection layers, etc. Furthermore, one or more residual structures (e.g., residual blocks) can be added to the lightweight neural network model to improve the accuracy of the signal detection of the lightweight neural network model. The residual structure means that the input of a node can be both of the output of the immediate previous depthwise separable sub-network of the node and the output of another previous depthwise separable sub-network besides to the immediate previous one. For example, as shown in FIG. 10, the input of the node "+" is both the output of the second depthwise separable sub-network 62 and the output of the fourth depthwise separable sub-network 64.

When training the lightweight neural network model, the sample signal data in the training set is input into the untrained lightweight neural network model for training. The optimizer for network training is set to RMSprop, and the learning rate is 1e-4. The loss function is the cross-entropy loss function, which is specifically:

$$C = -\frac{1}{n}\sum_{x}[y\ln a + (1 - y)\ln(1 - a)]$$

where x can represent the input sample signal data; y can represent the predicted value of the lightweight neural network model, that is, the predicted label of the input sample signal data; a can represent the actual output value of the lightweight neural network model, that is, the actual label of the input sample signal data; and n can represent the number of samples in the training set. The loss of each convolutional layer is calculated according to the loss function, and the weight of each convolutional layer is updated through backpropagation.

In this way, the weights of the output of the convolutional layer are updated by using the data in the backpropagation between the convolutional layers, such that the lightweight neural network model is trained and optimized, which can improve the accuracy of signal identification.

As shown in FIG. 9, in some embodiments, the process of training the lightweight neural network model according to the embodiments of the present application further comprises: performing one or more first iterations on the untrained lightweight neural network model according to a first loss data calculated by the first loss function (step S720), and in response to a number of the first iterations reaching a first preset number, stopping the first iterations to obtain the lightweight neural network model (step S725).

In some embodiments, the step S720 and the step S725 may be implemented by the identification module 120. In other words, the identification module 120 can be used to, during the training of supervised learning on the lightweight neural network model, stop the iteration after the number of iteration of the lightweight neural network model being trained reaches the first preset number, so as to obtain the trained lightweight neural network model.

In some embodiments, the processor 102 is used to, during the training of supervised learning on the lightweight neural network model, stop the iteration after the number of iteration of the lightweight neural network model being trained reaches the first preset number, so as to obtain the trained lightweight neural network model.

Specifically, the lightweight neural network model performs one or more iterations according to the loss data calculated by the loss function, and stops the iteration after the first preset number of iterations, and saves the weight data in the lightweight neural network model. The first preset number may be determined according to factors such as the application scenario of the lightweight network neural model and user's needs, and is not specifically limited, and may be 38 times, 50 times, 80 times, 100 times, etc., for example.

In this way, the accuracy of signal identification can be further improved.

FIG. 11 schematically shows a flowchart of a process of training a classifier according to an embodiment of the present application. As shown in FIG. 11, in some embodiments, the classifier is trained through the following steps:

at step S805, obtaining sample feature data output by the lightweight neural network model;

at step S810, inputting the sample feature data into an untrained classifier for a second training of supervised learning to obtain a sample identification prediction result;

at step S815, determining a second loss function based on the sample identification prediction result and the labels corresponding to the sample signal data;

at step S820, performing one or more second iterations on the untrained classifier according to a second loss data calculated by the second loss function; and at step S825, in response to a number of the second iterations reaching a second preset number, stopping the second iterations to obtain the classifier.

In some embodiments, the above steps may be implemented by the identification module 120. That is to say, the identification module 120 can be used to obtain sample feature data output by the lightweight neural network model; input the sample feature data into an untrained classifier for a second training of supervised learning to obtain a sample identification prediction result; determine a second loss function based on the sample identification prediction result and the labels corresponding to the sample signal data; perform one or more second iterations on the untrained classifier according to a second loss data calculated by the second loss function; and in response to a number of the second iterations reaching a second preset number, stop the second iterations to obtain the classifier.

In some embodiments, the processor 102 may be used to obtain sample feature data output by the lightweight neural network model; input the sample feature data into an untrained classifier for a second training of supervised learning to obtain a sample identification prediction result; determine a second loss function based on the sample identification prediction result and the labels corresponding to the sample signal data; perform one or more second iterations on the untrained classifier according to a second loss data calculated by the second loss function; and in response to a number of the second iterations reaching a second preset number, stop the second iterations to obtain the classifier.

Specifically, since the pre-trained lightweight neural network model is used to extract the feature data of the input demodulated information, after the trained lightweight neural network model is obtained, the sample feature data output by the pooling layer can be obtained as the input of the classifier, and the classifier experiences a training of supervised learning by using the sample feature data and the corresponding label (i.e., the label corresponding to the sample signal data that corresponds to the sample feature data) to obtain a trained classifier. In some embodiments, the pooling layer may be a global pooling layer.

Further, the training parameters of the classifier, such as the type, number, and loss function of the classifier, can be set in order to train the classifier. The classifier can be the extreme gradient boosting (xgboost) classifier which takes the Classification And Regression Trees (CART) model as the tree model, or other integrated classifiers, such as random forest or Gradient Boosting Decision Tree (GBDT), etc., which is not limited.

In some embodiments, the sample signal data is the signal data of the vital signs of the living body, such as heart rate signal data, and the label corresponding to the sample signal data is the state of the organs of the living body represented by the vital signs, such as normal, atrial fibrillation, other abnormal rhythms, noise, etc. The heart rate signal data is input into the untrained lightweight neural network model for supervised learning. After the first preset number of iterations, the trained lightweight neural network model is obtained. Then, the heart rate feature data of the heart rate signal data is obtained from the global pooling layer of the trained lightweight neural network model, and the untrained classifier experience a training of supervised learning according to the heart rate feature data and the labels corresponding to the heart rate signal data to obtain the trained classifier.

In this way, the accuracy of the classification result can be improved, and the efficiency of signal identification can be improved while ensuring the accuracy of the signal identification.

As shown in FIG. 11, in some embodiments, the training process of the classifier further comprises performing one or more second iterations on the untrained classifier according to a second loss data calculated by the second loss function (step S820) and in response to a number of the second iterations reaching a second preset number, stopping the second iterations to obtain the classifier (step S825).

In some embodiments, the above steps may be implemented by the identification module 120. In other words, the identification module 120 can be used in the training of supervised learning of the classifier, and to stop the iteration after the iteration of the classifier reaches the second preset number to obtain a trained classifier.

In some embodiments, the processor 102 is used to stop the iteration after the iteration of the classifier reaches the second preset number to obtain a trained classifier.

Specifically, the iteration of the classifier is stopped after the number of the iteration reaches the second preset number, and the weight data in the classifier is saved. The second preset number can be determined according to factors such as the application scenario of the classifier and user's needs, and is not specifically limited. For example, it can be 38 times, 50 times, 80 times, 100 times, etc.

In this way, the accuracy of signal identification can be further improved.

Figure 12:
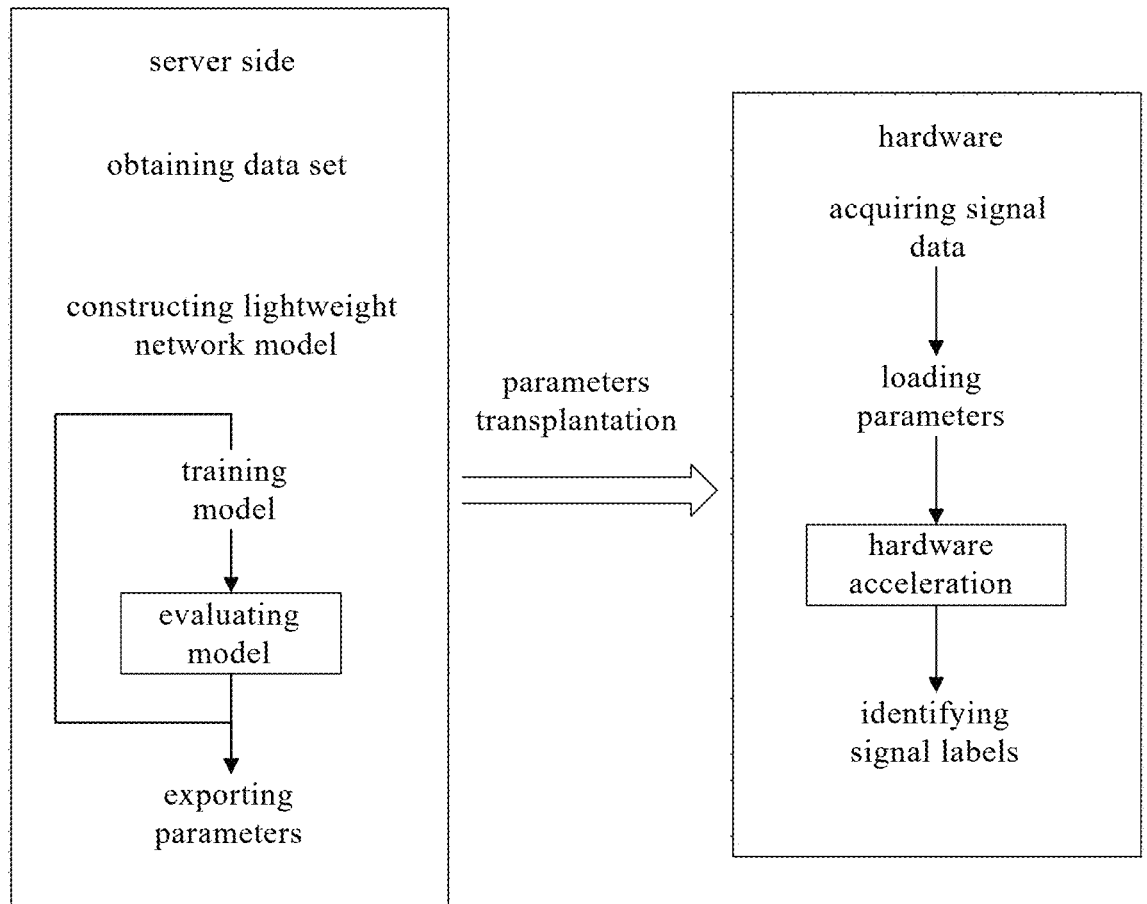
FIG. 12 schematically shows the transplantation process of the trained target network model.

FIG. 12 schematically shows the transplantation process of the trained target network model. After a first preset number of iterations of the lightweight neural network model and a second preset number of iterations of the classifier, it can be considered that the target network model has been trained. The training of the target network model can be done on the server side. Then, the parameters such as the saved weight data and other parameters can be transplanted to the hardware device. In the hardware device, the target network model can be built, the trained parameters can be loaded, and the hardware acceleration and other operations can be performed.

In some embodiments, the identified signal is heart rate. Specifically, the sample signal data is the heart rate signal data, and the labels corresponding to the sample signal data are normal, atrial fibrillation, other abnormal rhythms, and noise, etc. The sample heart rate signal data and the corresponding labels are input into the untrained lightweight neural network model for training of supervised learning. After the first preset number of iterations, the trained lightweight neural network model is obtained, and the weight data in the lightweight neural network model are saved. The sample heart rate feature data of the heart rate signal data is obtained from the (global) pooling layer of the trained lightweight neural network model, and the classifier experience a training of supervised learning according to the sample heart rate feature data and the label corresponding to the sample heart rate signal data. After a preset number of iterations, the trained classifier is obtained, and the weight data in the classifier is saved. The weight data in the lightweight neural network model and the weight data in the classifier are loaded into the target network model constructed in the hardware device, in order to perform operations such as signal acquisition, signal processing, hardware acceleration, and signal identification, and to output the label (i.e., the categories) corresponding to the signal.

In this way, it is possible to ensure the accuracy of signal identification while improving the efficiency of signal identification.

Figures 15, 16:
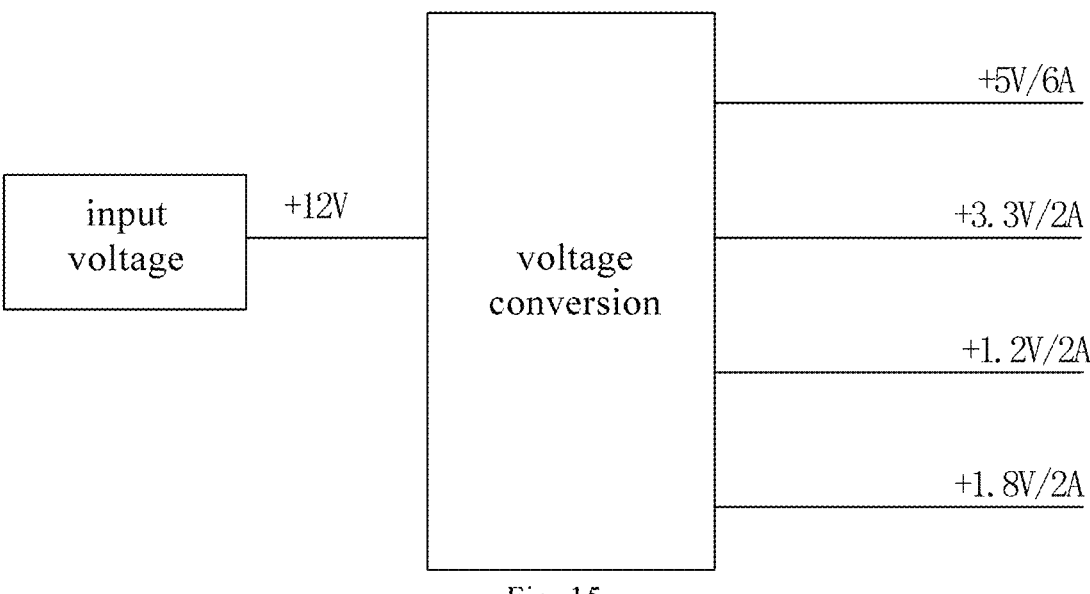
FIG. 15 schematically shows the power circuit design of the identification module of an apparatus for identifying a signal according to an embodiment of the present application.
FIG. 16 schematically shows the circuit design of the peripheral component interconnect express of the identification module of the apparatus for identifying a signal according to an embodiment of the present application.

FIG. 13 schematically shows a flowchart of a method for identifying a signal according to an embodiment of the present application. As shown in FIG. 15, in some embodiments, the step S50 comprises:

at step S905, receiving a control instruction;

at step S910, receiving and caching a weight data stream and a feature map data stream according to the control instruction;

at step S915, windowing the weight data stream to obtain a first windowed weight data sub-stream of a first quantity of channels and a second windowed weight data sub-stream of a second quantity of channels;

at step S920, windowing the feature map data stream to obtain a windowed feature map data sub-stream of a third quantity of channels, wherein the third quantity is equal to the first quantity;

at step S925, performing a first convolution processing on the windowed feature map data sub-stream by using the first windowed weight data sub-stream to obtain an intermediate data stream of a plurality of channels;

at step S930, performing a second convolution processing on the intermediate data stream of the plurality of channels by using the second windowed weight data sub-stream to obtain an output data stream; and at step S935, generating the feature data based on the output data stream.

In some embodiments, the steps S905 to the step S935 may be implemented by the identification module 120. That is, the identification module 120 can be used to receive the control instruction from the serial control unit 1161, receive and cache the weight data stream and the feature map data stream according to the control instruction, window the weight data stream to obtain a first windowed weight data sub-stream of a first quantity of channels and a second windowed weight data sub-stream of a second quantity of channels, window the feature map data stream to obtain a windowed feature map data sub-stream of a third quantity of channels wherein the third quantity is equal to the first quantity, perform a first convolution processing on the windowed feature map data sub-stream by using the first windowed weight data sub-stream to obtain an intermediate data stream of a plurality of channels, perform a second convolution processing on the intermediate data stream of the plurality of channels by using the second windowed weight data sub-stream to obtain an output data stream, and generate the feature data based on the output data stream.

In some embodiments, the processor 102 is used to receive the control instruction from the serial control unit 1161, receive and cache the weight data stream and the feature map data stream according to the control instruction, window the weight data stream to obtain a first windowed weight data sub-stream of a first quantity of channels and a second windowed weight data sub-stream of a second quantity of channels, window the feature map data stream to obtain a windowed feature map data sub-stream of a third quantity of channels wherein the third quantity is equal to the first quantity, perform a first convolution processing on the windowed feature map data sub-stream by using the first windowed weight data sub-stream to obtain an intermediate data stream of a plurality of channels, perform a second convolution processing on the intermediate data stream of the plurality of channels by using the second windowed weight data sub-stream to obtain an output data stream, and generate the feature data based on the output data stream.

Figure 14:
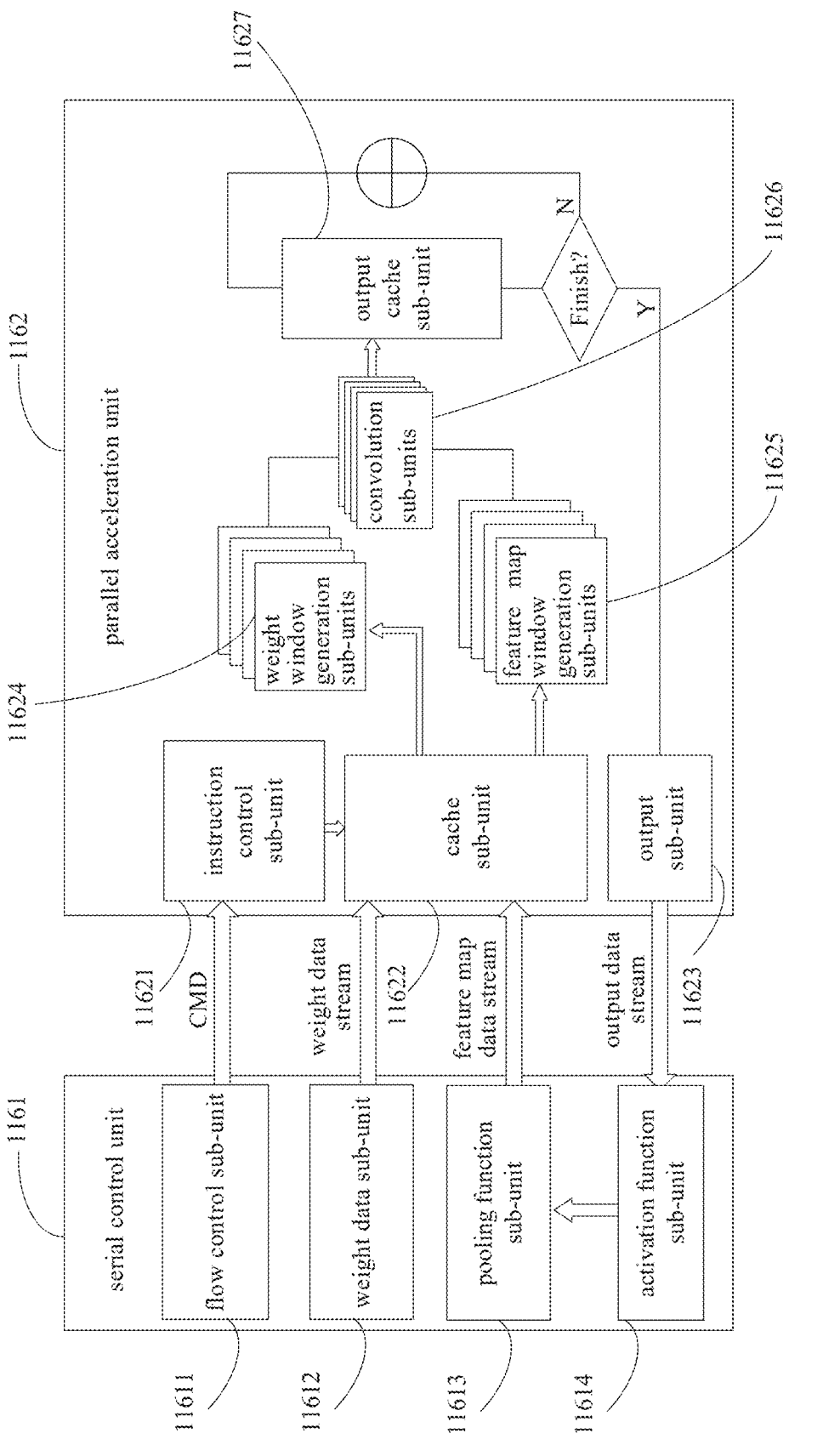
FIG. 14 schematically shows a block diagram of the internal structure of the identification module of an apparatus for identifying a signal according to an embodiment of the present application.

FIG. 14 schematically shows a block diagram of the internal structure of the identification module. As shown in FIG. 14, the serial control unit 1161 sends the control instruction (CMD), weight data stream and feature map data stream to the parallel acceleration unit 1162, and receives the output data stream returned by the parallel acceleration unit, and activates and pools the output data stream. Furthermore, the serial control unit can also generate an updated feature map data stream after activating and pooling the output data stream, and send the updated feature map data stream to the parallel acceleration unit for one or more iterations.

The parallel acceleration unit receives the control instruction from the serial control unit, and performs the following operations according to the control instruction: receiving and caching a weight data stream and a feature map data stream; windowing the weight data stream to obtain a first windowed weight data sub-stream of a first quantity of channels and a second windowed weight data sub-stream of a second quantity of channels; windowing the feature map data stream to obtain a windowed feature map data sub-stream of a third quantity of channels, wherein the third quantity is equal to the first quantity; performing a first convolution processing on the windowed feature map data sub-stream by using the first windowed weight data sub-stream to obtain an intermediate data stream of a plurality of channels; performing a second convolution processing on the intermediate data stream of the plurality of channels by using the second windowed weight data sub-stream to obtain an output data stream; and generating the feature data based on the output data stream.

The feature map data stream can be the input time-domain signal and/or frequency-domain information when it is first transmitted to the parallel acceleration unit. The feature map data stream after the first transmission can be the time-domain signal and/or frequency-domain information processed by using the convolutional neural network on the input time-domain signal and/or frequency-domain signal. The weight data stream is the weight parameters of the convolutional neural network, which can be obtained through training.

Further, the serial control unit 1161 comprises a flow control sub-unit 11611, a weight data sub-unit 11612, a pooling function sub-unit 11613, and an activation function sub-unit 11614. The parallel acceleration unit 1162 comprises an instruction control sub-unit 11621, a cache sub-unit 11622, multiple weight window generation sub-units 11624, multiple feature map window generation sub-units 11625, multiple convolution sub-unit 11626 respectively corresponding to the weight window generation sub-units 11624 and the feature map window generation sub-units 11625, an output cache sub-unit 11627, and an output sub-unit 11623.

In the serial control unit 1161, the flow control sub-unit 11611 is used to send the control instruction (CMD) to the instruction control sub-unit 11621, and the weight data sub-unit 11612 is used to send the weight data stream to the cache sub-unit 11622, the pooling function sub-unit 11613 is used to send the feature map data stream to the cache sub-unit 11622, and the activation function sub-unit 11614 is used to activate the output data stream of the output sub-unit 11623.

In the parallel acceleration unit 1162, the instruction control sub-unit 11621 is coupled to the cache sub-unit 11622, the cache sub-unit 11622 is coupled to the weight window generation sub-unit 11624 and the feature map window generation sub-unit 11625, and the weight window generation sub-units 11624 and the feature map window generation sub-units 11625 are coupled to the corresponding convolution sub-units 11626, the convolution sub-units 11626 are coupled to the output cache sub-unit 11627, and the output cache sub-unit 11627 is coupled to the output sub-unit 11623.

Further, the instruction control sub-unit 11621 receives the control instruction CMD of the serial control unit, and controls the cache sub-unit 11622 based on the control instruction.

The cache sub-unit 11622 receives the control instruction CMD, receives and caches the weight data stream and the feature map data stream according to the control instruction CMD, sends the weight data stream in parallel to multiple weight window generation sub-units 11624, and sends the feature map data stream in parallel to multiple feature map window generation sub-units 11625. The feature map data stream and weight data stream are cached, such that the feature map data stream and the weight data stream can be saved before being input into the convolution sub-unit 11626 and the cached feature map data stream and weight data stream can be deleted after certain number of iterations, so the data storage of machine learning model can be optimized.

In addition, the cache sub-unit 11622 can divide the weight data stream into multiple channels of weight data sub-streams, and divide the feature map data stream into multiple feature map data sub-streams. Each channel of weight data sub-stream is sent to the corresponding weight window generation sub-unit 11624, and each channel of feature map data sub-stream is sent to the corresponding feature map window generation sub-unit 11625, in order to complete the transmission of multiple channels of weight data sub-streams and multiple channels of feature map data sub-streams.

The weight window generation sub-unit 11624 receives the weight data stream from the cache sub-unit 11622 and performs windowing processing on the weight data stream to obtain the windowed weight data sub-stream, including a first windowed weight data sub-stream of a first quantity of channels and a second windowed weight data sub-stream of a second quantity of channels, and outputs the windowed weight data sub-stream to the corresponding convolution sub-unit 11626. Multiple weight window generation sub-units 11624 can be windowed in parallel. Windowing processing refers to converting the data stream into two-dimensional data. The window size can be set according to factors such as the application scenario of the lightweight network neural model and user's needs, such as the generated matrix data of 3*3, 5*5, 7*7, etc., which is not specifically limited.

The feature map window generation sub-unit 11625 receives the feature map data sub-stream from the cache sub-unit 11622, and performs windowing processing on the feature map data sub-stream. In some embodiments, filling processing may be performed to obtain windowed feature map data sub-stream, and the windowed feature map data sub-stream is output to the corresponding convolution sub-unit 11626. Multiple feature map window generation sub-units 11625 can be filled and windowed in parallel. The filling processing includes processes such as filling 0. The convolution sub-unit 11626 performs a first convolution processing on the windowed feature map data sub-stream by using the first windowed weight data sub-stream to obtain an intermediate data stream. The output cache sub-unit 11627 performs a second convolution processing on the intermediate data stream of the plurality of channels by using the second windowed weight data sub-stream to obtain an output data stream which is output to the output sub-unit 11623. Generating the output data stream according to the intermediate data stream comprises: accumulating (for example, by using the adder block shown in FIG. 14) the intermediate data stream to obtain the output data stream. When the input feature map data stream includes multiple channels, the output data stream is obtained by accumulating (for example, by using the adder block shown in FIG. 14) the intermediate data stream obtained by convolution of each channel. Then, whether the processing of the data of the current convolutional layer has finished is determined at the Finish block shown in FIG. 14. When the processing is finished, the data cached by the output cache sub-unit is output to the output sub-unit. The output sub-unit 11623 outputs the output data stream to the serial control unit 1161. In the context of this application, the terms "unit" and "sub-unit" can be understood as "circuit" and "sub-circuit".

In this way, the amount of parameters of the target network model can be reduced, the computational load of the target network model can be reduced, and the efficiency of signal identification can be improved. At the same time, the signal identification result can be displayed on the graphical user interface, which is convenient for users to understand relevant information and may optimize user experience.

FIG. 15 schematically shows the power circuit design of the identification module. As shown in FIG. 15, in some embodiments, the input voltage of the identification module 116 is 12 V. The 12 V input voltage can be provided by an external power supply and converted into 5 V, 3.3 V, 1.2 V, 1.8 V and other voltages respectively after voltage conversion, which can be used as core power supply, input power supply, output power supply and digital interface power supply.

FIG. 16 schematically shows the circuit design of the peripheral component interconnect express (PCIE) standard of the identification module. As shown in FIG. 16, the input and output interface of the identification module 120 can be in the form of PCIEx8, and can be connected to the host through the interface to complete the high-speed transmission of input data and output data of the convolutional neural network to ensure the stability and real-time performance of data interaction.

The apparatus for identifying a signal according to the embodiment of the present application includes a signal processing module 126, a communication module 124, an identification module 120, and a display module 122. Among them, the frequency-modulated signal generation module 1141 of the signal processing module 126 is used to generate a modulated signal. The transmission signal generating module 112 of the communication module 124 is used to demodulate the modulated signal to generate a transmission signal. The signal transmitting module 114 is used to transmit the transmission signal, and the echo signal receiving module 116 is used to receive the echo signal of the transmission signal. The echo signal demodulating module 118 of signal processing module 126 is used to demodulate the echo signal to obtain demodulated information. The identification module 120 is used to identify the time-domain signal and/or frequency-domain information by using the trained target network model to obtain the identification result. The display module 122 is used to output the identification result to the graphical user interface for display.

Further, the demodulation unit 1142 is used to perform quadrature demodulation on the echo signal to obtain a time-domain signal, and perform Fast Fourier Transform on the time-domain signal to obtain frequency-domain information.

The identification module 120 comprises a serial control unit 1161 and a parallel acceleration unit 1162. The serial control unit 1161 is used to control the parallel acceleration unit 1162. The serial control unit 1161 comprises a flow control sub-unit 11611, a weight data sub-unit 11612, a pooling function sub-unit 11613 and an activation function sub-unit 11614. The parallel acceleration unit 1162 is used to implement parallel convolution calculations. The parallel acceleration unit 1162 comprises an instruction control sub-unit 11621, a cache sub-unit 11622, a weight window generation sub-unit 11624, a feature map window generation sub-unit 11625, a convolution sub-unit 11626, an output cache sub-unit 11627, and an output sub-unit 11623.

The identification module 120 also comprises a classification unit, which is used to classify and identify the feature data to obtain an identification result. The classification unit can classify and identify the extracted feature data to improve the accuracy of the classification results, thereby improving the efficiency of signal identification while ensuring the accuracy of signal detection.

The apparatus for identifying a signal 110 according to the embodiment of this application uses the method for identifying a signal of any of the above embodiments to obtain the time-domain signal and/or frequency-domain information from the echo signal of the transmission signal, and identify the time-domain signal and/or frequency-domain information by using a trained target network model, which can reduce the number of parameters of the target network model, reduce the computational load of the target network model, and improve the efficiency of signal identification. At the same time, the signal identification result can be displayed on the graphical user interface, which is convenient for users to learn the relevant information and may optimize user experience.

The embodiment of the present application also provides a non-volatile computer-readable storage medium storing thereon computer programs or instructions. When the computer programs or instructions are executed by one or more processors, the method for identifying a signal described in any of the above embodiments would be implemented.

In the description of this specification, the description with reference to the terms "an embodiment", "some embodiments", "exemplary embodiments", "examples", "specific examples", or "some examples", etc. means the specific features, structures, materials, or characteristics described in combination with the embodiments or the examples are included in at least one embodiment or example of the present application. In this specification, the schematic expression of the above-mentioned terms does not necessarily refer to the same embodiment or example. Moreover, the described specific features, structures, materials or characteristics can be combined in an appropriate manner in any one or more embodiments or examples.

A person of ordinary skill in the art can understand that all or part of the steps carried in the method of the foregoing embodiments can be implemented by relevant hardware instructed by a program. The program can be stored in a computer-readable storage medium. When the program is executed, one or more steps of the method according to the embodiments will be implemented.

In addition, each functional unit in each embodiment of the present application may be integrated into one processing module, or may exist alone physically, or two or more units may be integrated into one module. The above-mentioned integrated unit or module can be implemented in the form of hardware or the form of software functional unit or module. If the integrated unit or module is implemented in the form of a software functional module or unit and is sold or used as an independent product, it can also be stored in a computer readable storage medium.

The storage medium mentioned above can be a read-only memory, a magnetic disk or an optical disk, etc.

Although the embodiments of the present application have been shown and described, those of ordinary skill in the art can understand that various changes, modifications, substitutions and deformations can be made to these embodiments without departing from the principle and purpose of the present application. The scope of the application is defined by the claims and their equivalents.

We claim:

1. A method for identifying a signal, comprising:
   demodulating a modulated signal to generate a transmission signal;
   transmitting the transmission signal;
   receiving an echo signal generated by a reflection of the transmission signal;
   demodulating the echo signal to obtain demodulated information;
   identifying the demodulated information by using a target network model to obtain an identification result of the echo signal; and
   outputting the identification result to a graphical user interface for display.

2. The method according to claim 1,
   wherein demodulating the echo signal to obtain the demodulated information comprises:
   performing quadrature demodulation on the echo signal to obtain a time-domain signal, and
   wherein identifying the demodulated information by using the target network model to obtain the identification result of the echo signal comprises:
   identifying the time-domain signal by using the target network model to obtain the identification result of the echo signal.

3. The method according to claim 1,
   wherein demodulating the echo signal to obtain the demodulated information comprises:
   performing quadrature demodulation on the echo signal to obtain a time-domain signal; and
   performing a Fast Fourier Transform on the time-domain signal to obtain frequency-domain information, and
   wherein identifying the demodulated information by using the target network model to obtain the identification result of the echo signal comprises:
   identifying the time-domain signal and the frequency-domain information by using the target network model to obtain the identification result of the echo signal.

4. The method according to claim 1,
   wherein demodulating the echo signal to obtain the demodulated information comprises:
   performing quadrature demodulation on the echo signal to obtain a time-domain signal; and
   performing a Fast Fourier Transform on the time-domain signal to obtain frequency-domain information, and
   wherein identifying the demodulated information by using the target network model to obtain the identification result of the echo signal comprises:
   identifying the frequency-domain information by using the target network model to obtain the identification result of the echo signal.

5. The method according to claim 1, wherein the target network model comprises a lightweight neural network model and a classifier, and wherein identifying the demodulated information by using the target network model to obtain the identification result of the echo signal comprises:

inputting the demodulated information into the lightweight neural network model to obtain feature data; and inputting the feature data into the classifier to obtain the identification result.

6. The method according to claim 5, wherein the lightweight neural network model is trained by operations comprising:

obtaining sample signal data and labels corresponding to the sample signal data;

inputting the sample signal data into an untrained lightweight neural network model for a first training of supervised learning to obtain sample feature prediction data;

determining a first loss function based on the sample feature prediction data and the labels corresponding to the sample signal data;

performing one or more first iterations on the untrained lightweight neural network model according to a first loss data calculated by the first loss function; and in response to a number of the first iterations reaching a first preset number, stopping the first iterations to obtain the lightweight neural network model.

7. The method according to claim 6, wherein the classifier is trained by operations comprising:

obtaining sample feature data output by the lightweight neural network model;

inputting the sample feature data into an untrained classifier for a second training of supervised learning to obtain a sample identification prediction result;

determining a second loss function based on the sample identification prediction result and the labels corresponding to the sample signal data;

performing one or more second iterations on the untrained classifier according to a second loss data calculated by the second loss function; and in response to a number of the second iterations reaching a second preset number, stopping the second iterations to obtain the classifier.

8. The method according to claim 5, wherein inputting the demodulated information into the lightweight neural network model to obtain the feature data comprises:

receiving a control instruction;

receiving and caching a weight data stream and a feature map data stream according to the control instruction;

windowing the weight data stream to obtain a first windowed weight data sub-stream of a first quantity of channels and a second windowed weight data sub-stream of a second quantity of channels;

windowing the feature map data stream to obtain a windowed feature map data sub-stream of a third quantity of channels, wherein the third quantity is equal to the first quantity;

performing a first convolution processing on the windowed feature map data sub-stream by using the first windowed weight data sub-stream to obtain an intermediate data stream of a plurality of channels;

performing a second convolution processing on the intermediate data stream of the plurality of channels by using the second windowed weight data sub-stream to obtain an output data stream; and generating the feature data based on the output data stream.

9. A computing device, comprising:

a memory configured to store computer-executable instructions; and a processor configured to execute the computer-executable instructions to cause the computing device to perform the method according to claim 1.

10. A computer-readable non-transitory storage medium, comprising computer-executable instructions that when executed by a processor of a computing device cause the processor to perform the method according to claim 1.

11. An apparatus for identifying a signal, comprising:

a transmission signal generating module, configured to demodulate a modulated signal to generate a transmission signal;

a signal transmitting module, configured to transmit the transmission signal;

an echo signal receiving module, configured to receive an echo signal generated by a reflection of the transmission signal;

an echo signal demodulating module, configured to demodulate the echo signal to obtain demodulated information;

an identification module, configured to identify the demodulated information by using a target network model to obtain an identification result of the echo signal; and a display module, configured to output the identification result to a graphical user interface for display.

12. The apparatus according to claim 11, wherein the echo signal demodulating module is further configured to perform quadrature demodulation on the echo signal to obtain a time-domain signal.

13. The apparatus according to claim 12, wherein the echo signal demodulating module is further configured to perform a Fast Fourier Transform on the time-domain signal to obtain frequency-domain information.

14. The apparatus according to claim 11, wherein the identification module comprises a serial control unit and a parallel acceleration unit, and wherein the serial control unit is configured to control the parallel acceleration unit, and the parallel acceleration unit is configured to achieve a parallel convolution calculation.

15. The apparatus according to claim 14, wherein the serial control unit comprises a flow control sub-unit, a weight data sub-unit, a pooling function sub-unit, and an activation function sub-unit.

16. The apparatus according to claim 14, wherein the parallel acceleration unit comprises an instruction control sub-unit, a cache sub-unit, a weight window generation sub-unit, a feature map window generation sub-unit, a convolution sub-unit, an output cache sub-unit, and an output sub-unit.

* * * * *